Dec. 14, 1948.  W. E. SCHULTZ  2,455,953
WHEEL MOUNTING HOLDER
Filed Feb. 25, 1947
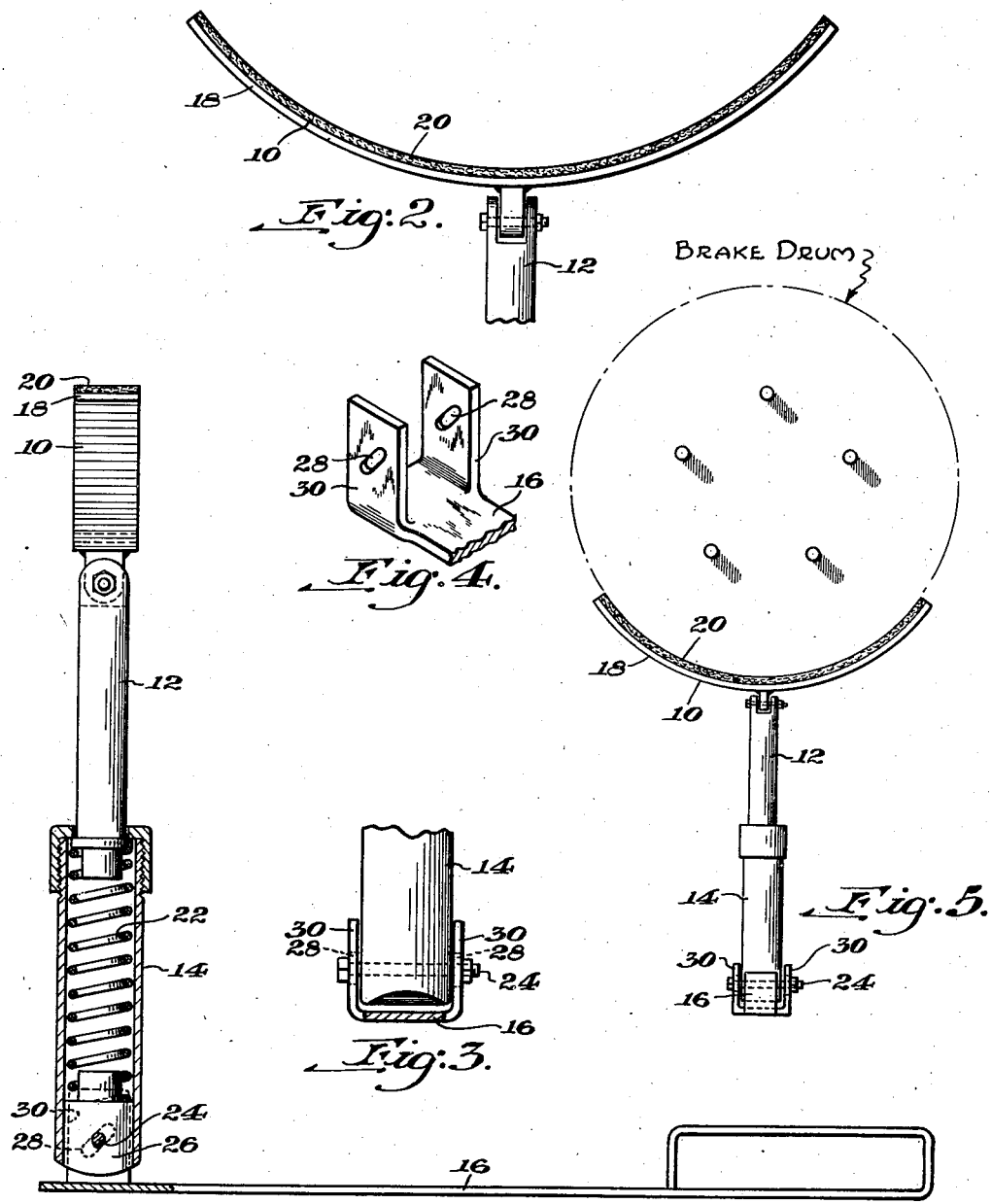
Inventor
WALTER E. SCHULTZ.
By Edmund G. W. Bordley
his Attorney Patented Dec. 14, 1948

2,455,953

UNITED STATES PATENT OFFICE 2,455,953

WHEEL MOUNTING HOLDER

Walter Emanuel Schultz, Weirton, W. Va.

Application February 25, 1947, Serial No. 730,845

5 Claims. (Cl. 188—32)

This invention relates to wheel-mounting holders. More particularly the invention relates to a holder that will bear on the hub or brake band of a wheel to hold the hub from rotation while a wheel or tire is being changed.

Automobiles and truck tires are commonly mounted on the periphery of metal disks, or wooden wheels which have a metal plate at the axis which is provided with holes that register with bolts that are mounted in the hub of the wheel. The hub in turn is generally fixed to the axle and is not removed when the wheel or tire is being changed. If a tire is punctured, blown out, or is to be changed the nuts on the hub bolts are removed so that the wheel and tire, or tire may be removed as a unit.

With most automotive vehicles, the front wheel hubs are freely rotatable. Any wheel hub that is freely rotatable presents a troublesome problem when a heavy wheel with a tire thereon is to be mounted on the movable hub. To mount a wheel on the hub the axle and hub are raised by a jack so that when the wheel is attached to the hub it will be sufficiently elevated from the ground or floor that the wheel and tire will be freely rotatable. The wheel and tire must be lifted from the floor to be mounted on the hub bolts and it is a difficult problem to hold the heavy wheel in elevated position and at the same time adjust the openings in the wheel plate to register with the bolts in the hub.

The primary object of the present invention is to provide a holder for a wheel hub to prevent its rotation while the wheel is being properly positioned on the hub bolts.

Another object of the invention is to provide a wheel hub holder which may be easily and readily placed into and removed from holding position.

A further object of the invention is to provide a hub holder which is simple in construction and adapted for rough handling.

With these and other objects in view, the invention consists in the wheel hub holder hereinafter described and particularly defined in the claims.

The various features of the invention are illustrated in the accompanying drawings in which Figure 1 is a view in side elevation with parts in section, showing the preferred form of the wheel hub holder;

Figure 2 is a fragmentary view of the hub-engaging shoe, the view being taken at right angles to the view of the shoe shown in Figure 1;

Figure 3 is a fragmentary view of the lower portion of the cylinder for supporting the hub-engaging shoe;

Figure 4 is a perspective view of a yoke in which the shoe supporting cylinder is mounted; and Figure 5 is a view in front elevation of the hub holder showing its relation to a wheel hub.

Referring to the drawing, the wheel hub holder is composed broadly of a hub-engaging shoe 10 supported upon a plunger 12 which is yieldably mounted in a cylinder 14 which is supported in a handle 16. The shoe 10 is made up of an arcuate plate 18 having a fabric brake band material 20 attached thereto. The brake band face 20 is arranged to engage the face of the brake drum or hub of a wheel to be held from rotation and preferably has a friction face to maintain a definite hold of the shoe upon the hub when it is impressed into contact therewith. The plate 18 is pivotally mounted at the upper end of the plunger 12 so that the shoe may be tilted in being placed under the brake drum or hub of a wheel. The plunger 12 is yieldably mounted on the upper end of compression spring 22 which is mounted within the cylinder 14. The spring 22 normally holds the plunger and brake shoe in elevated position and acts to yieldably press the brake shoe against the brake drum, or hub of a wheel with enough pressure to hold it from rotation.

The movement of the plunger within the cylinder, which generally will provide a movement of three to four inches, will permit a single hub holder to be used with different sizes of wheels. It has been found in practice that two different sizes of hub holders may be used to adapt them for use with practically all of the different types of wheels that are in use on automotive vehicles.

The cylinder 14 has a pivotal mounting on a bolt 24 that passes through the cylinder and a block 26 mounted in the lower end of the cylinder. The bolt 24 passes through slots 28 in a yoke 30 formed on one end of the handle 16. It will be noted that the block 26 has a convex shape at its bottom to permit the cylinder to oscillate through a limited angle on the bolt 24. By tilting the shoe 10 on the plunger 12 and at the same time adjusting the angle of the cylinder 14 with reference to the handle 16, the shoe may be moved into position under a hub. Then by forcing the plunger and cylinder into substantially vertical position by means of the handle 16 the shoe may be moved into engagement with the brake drum or hub to the full force of compression of spring 22. When the cylinder 14 is moved into vertical position the bolt 24 will have been moved in the slot 28 so that the bottom of the block 26 will rest on the upper face of the handle plate 16. This compression is sufficient to hold the hub from rotation. With the holder in the position illustrated in Figure 5, the wheel may be mounted on the hub bolts and when one or more of the bolts have been passed through the openings in the wheel disk, the hub holder may be removed, or the hub bolts may be tightened while the holder is in position and then removed after the bolts have been tightened. The holder being in clamping position is advantageous while the bolts are being tightened because it holds the wheel from rotation and allows the bolts to be tightened without a tendency for the wheel to rotate. The holder is removed from its clamping or holding position by merely pulling on the handle 16 to move the plunger and cylinder from vertical to an inclined position.

The pivotal mounting of the hub shoe plate 18 on the upper end of the plunger 12, advantageously may be a ball and socket joint, to permit the hub shoe to be placed under the hub from the side or the front of the car or truck to be moved into holding position.

In actual use the tool described above has been found to be very useful in changing wheels of automotive equipment. The apparatus is very easily adjusted into position and withdrawn from clamping position. Furthermore, the apparatus is simple and has a construction of parts which will not readily get out of order.

The wheel holder decribed above is a rigid piece of apparatus and preferably should remain in clamping position under the wheel hub until the tire has been changed. If, for example, the jack for lifting the car should collapse or the car jack slip out of position, the wheel holder would support the wheel hub and axle to prevent the hub from falling to the ground or from falling upon an operator who might be working with the wheel. If the weight of the car should be placed on the tool the compression spring would be compressed to the point where the plunger 12 would rest against the block 26 and thus would form a rigid support for the car.

The various features of the invention having been thus described, what is claimed as new is:

1. A wheel hub holder comprising: a hub-engaging friction shoe, a plunger for supporting the shoe, a floor-engaging member, a spring connected between the floor member and the plunger arranged to yieldably move the plunger away from the member, and a handle connected with said member to move the member and plunger into position to force the shoe into pressure engagement with the hub.

2. A wheel hub holder comprising; a hub-engaging friction shoe, a plunger for supporting the shoe, a floor-engaging member having a handle thereon, a cylinder pivotally mounted in said member, a plunger mounted in the cylinder, a compression spring mounted in the cylinder and arranged to engage the plunger to normally move the plunger away from said member, and a hub shoe mounted on the plunger.

3. The combination defined in claim 2 in which the shoe is pivotally connected to the plunger.

4. The combination defined in claim 2 in which the shoe has a friction face for engaging the brake drum or circular surface on a wheel hub.

5. The combination defined in claim 2 in which the pivotal mounting of the cylinder in the floor-member consists of a pin and slots to permit the cylinder to move vertically with reference to the member.

WALTER EMANUEL SCHULTZ.

REFERENCES CITED

The following references are of record in the file of this patent:

UNITED STATES PATENTS

| Number | Name | Date |
| --- | --- | --- |
| 1,548,326 | McDuffie | Aug. 4, 1925 |
| 1,681,192 | McBride | Aug. 21, 1928 |
| 1,898,109 | Wickstrum | Feb. 21, 1933 |